United States Patent
Dunn, Jr. et al.

(10) Patent No.: US 7,920,491 B1
(45) Date of Patent: *Apr. 5, 2011

(54) SYSTEM AND METHOD FOR SPLIT ISOLATION IN RADIO FREQUENCY ELECTRONICS

(75) Inventors: Gary R. Dunn, Jr., Taylorsville, UT (US); Richard A. McNamee, Salt Lake City, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/723,868

(22) Filed: Mar. 15, 2010

Related U.S. Application Data (63) Continuation-in-part of application No. 11/818,339, filed on Jun. 13, 2007, now Pat. No. 7,697,462.

(51) Int. Cl.
 H04B 7/005 (2006.01)
 H04B 3/20 (2006.01)
(52) U.S. Cl. ........................ 370/278; 370/288; 370/290
(58) Field of Classification Search .................. None
 See application file for complete search history.

(56) References Cited

U.S. PATENT DOCUMENTS

| | | |
|---|---|---|
| 6,282,176 B1 | 8/2001 | Hemkumar |
| 6,674,999 B2 | 1/2004 | Ramachandran |
| 6,738,602 B1 | 5/2004 | Heinen et al. |
| 6,795,690 B2 | 9/2004 | Weissman et al. |
| 7,130,596 B2 | 10/2006 | Ramachandran |
| 7,162,156 B2 | 1/2007 | Frey et al. |
| 7,512,149 B2 | 3/2009 | Basso et al. |
| 7,577,248 B2 | 8/2009 | McCree |
| 2004/0097189 A1* | 5/2004 | Bongfeldt et al. ................. 455/7 |
| 2005/0136854 A1* | 6/2005 | Akizuki et al. ................. 455/91 |
| 2006/0281423 A1 | 12/2006 | Caimi et al. |

\* cited by examiner

*Primary Examiner* — Chi H Pham
*Assistant Examiner* — Soon-Dong D Hyun
(74) *Attorney, Agent, or Firm* — Kirton & McConkie; William T. Ralston (57) ABSTRACT

A system and method for designing a full duplex communications transceiver to enable a reduction in isolation between a transmit signal and a receive signal at a diplexer is disclosed. An RFE transmit filter attenuation level can be determined to be sufficient to attenuate a noise power of the transmitter below a thermal noise floor of the power amplifier. A minimum diplexer transmit filter attenuation level can be calculated to attenuate noise power output from the power amplifier in the receive band to a level below a noise floor of the receiver.

18 Claims, 6 Drawing Sheets

701 — Accept Input Parameters from the User

730 — Calculate $I_{FTX}$ using equation (6)
Calculate $I_{DTX}$ using equation (9)

720 — Calculate $I_{RX}$ using equation (1)
Calculate $I_{FRX}$ using equation (5)
Calculate $I_{DRX}$ using equation (4)

703 — Provide Output Parameters to the User

FIG. 7

SYSTEM AND METHOD FOR SPLIT ISOLATION IN RADIO FREQUENCY ELECTRONICS

This application is a continuation in part of U.S. patent application Ser. No. 11/818,339, filed on Jun. 13, 2007, with the same title as the present application, and which is herein incorporated by reference.

BACKGROUND

As technology has advanced one of the benefits has been a reduction in the size of electronic devices. One area that has benefited from this phenomenon is the field of communications. Miniaturization of various types of electronics has enabled the creation of smaller, lighter, and cheaper transceivers. Cell phones and portable radios have become smaller and capable of communicating over greater distances or using reduced power levels. Another transceiver application where this trend has been observed in recent years is the Common Data Link (CDL) program. CDL is a family of data links that provide full duplex, point-to-point digital microwave communications for the Intelligence, Surveillance, and Reconnaissance (ISR) community. CDL provides for the command, control and communications between the ISR sensor platforms and ground station processors. Smaller and lighter CDL electronics have greatly expanded the number of applications and platforms that can accommodate CDL electronics. Size, weight, and power sensitive applications such as Unmanned Aerial Vehicles and portable CDL data links are examples of more recent CDL applications.

As transmission power has increased between transceivers, the amount of isolation required between the transmitter and receiver in a typical receiver has also increased. Isolation between transmitter and receiver is typically used in a full duplex transceiver to keep the transmitter from jamming the receiver. Isolation is usually provided in the front-end electronics portion of a transceiver, typically referred to as the Radio Frequency Electronics (RFE). The RFE normally includes a power amplifier, diplexer, and Low Noise Amplifier (LNA); and may also include switches and filters, providing the front-end amplification and isolation for a data link. The RFE is the component of high power communication systems that has most resisted the trend of miniaturization. The reason the RFE has not shrunk significantly is primarily due to the largest component of the traditional RFE, the waveguide diplexer, which due to critical internal cavity dimensions, cannot shrink.

A diplexer can be used to achieve the sufficient transmit to receive isolation that enables a full duplex link, such as a CDL link, to use a single antenna. Since isolation on the order of 120 dB between the transmitter and receiver is typically needed in combination with a low insertion loss, usually no more than 3 dB, a waveguide filter diplexer is often used over other filter implementations. While providing superior isolation with low insertion loss, the relative disadvantage of the waveguide filter diplexer is that it can be significantly larger and heavier than other components within the RFE.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

In the design analysis that follows parameters recited in the disclosed equations are typically specified by their associated components. Alternatively, the parameters can be measured using standard measuring techniques. Accordingly, it will be appreciated that input parameters and output parameters of the disclosed design systems, processes and methods correspond to characteristics of physical objects as described herein.

Figure 1:
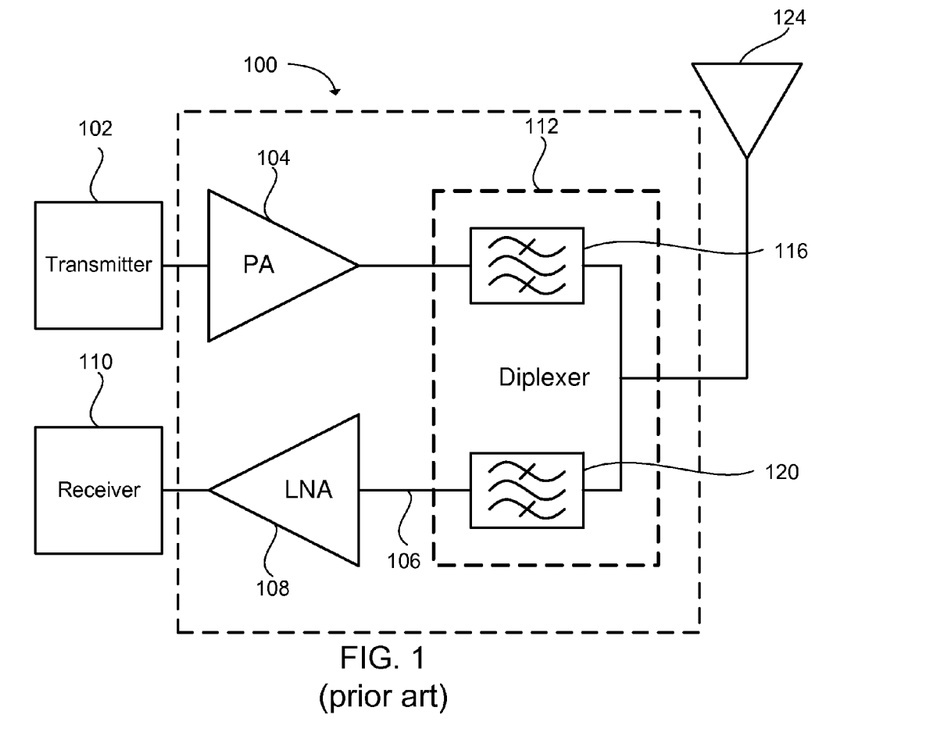
FIG. 1 is a block diagram of a typical RFE.

The block diagram of a simple, traditional or standard RFE 100 can be seen in FIG. 1. The RFE includes a transmit path wherein a transmit signal is routed through the power amplifier 104, into the diplexer 112, through the diplexer transmit filter 116 and out to the antenna 124. For example, a modulated signal can be upconverted in a transmitter 102 to the final radio frequency for transmission and input into the power amplifier 104. Once amplified, the transmit signal is routed through the diplexer transmit filter 116 to the antenna 124.

The RFE also includes a receive path, wherein a receive signal is received by the antenna 124, travels into the diplexer 112 and is routed through the diplexer receive filter 120 and into the low noise amplifier (LNA) 108. The receive signal can then be routed out of the RFE 100 and into the receiver 110, as can be appreciated. Signals in the appropriate band, as received by the antenna, are routed through the diplexer receive filter 120 to the LNA 108. After the system signal to noise ratio has been set by the LNA, the receive signal is passed on to be downconverted and demodulated in the receiver 110.

Figure 2:
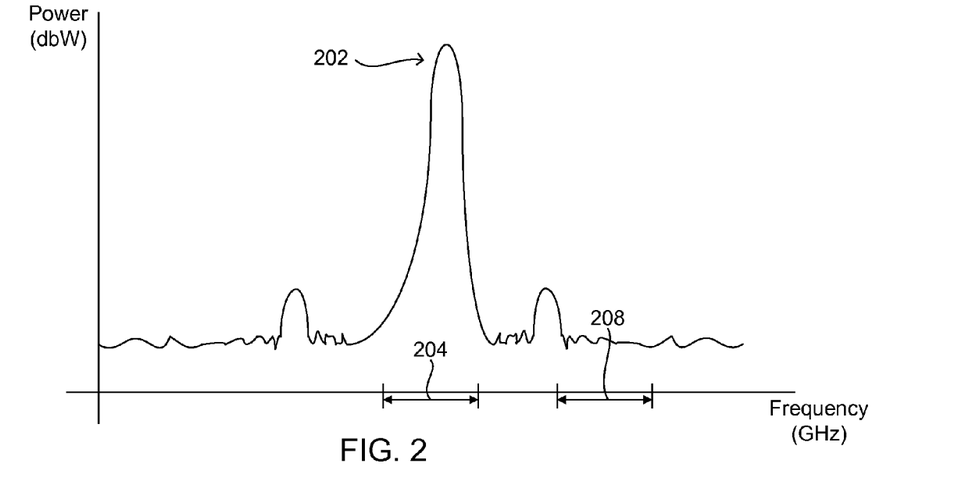
FIG. 2 is a graph depicting a transmit signal spectrum.

Microwave power in two frequency bands emitted from the transmitter power amplifier 104 is of concern to the receiver 110. The two frequency bands of concern are the transmit band and the receive band. An example transmit signal 202 is shown in FIG. 2 in the frequency domain, with an exemplary transmit band 204 and receive band 208 displayed. For illustrative purposes, the transmit band may be a band from 12.2 GHz to 12.5 GHz, comprising 300 MHz of bandwidth. The receive band may be from 12.8 GHz to 13.1 GHz. It is understood that the invention is not limited to these values. The transmit and receive bands may have the same bandwidth or different amounts of bandwidth. The bandwidth of each band can range from several hertz to several gigahertz and can be located throughout the radio spectrum, depending upon design needs.

In the transmit bandwidth exists the main power of the transmitted signal, which can jam the receiver. In the receive bandwidth, power emitted by the power amplifier can cause difficulties for the receiver, effectively raising the noise temperature and lowering the gain over system noise temperature ratio (G/T) of the receiver.

In a traditional or standard RFE isolation analysis, the main power in the transmit band output from the power amplifier 104, as shown in FIG. 1, is typically not allowed to capture any automatic gain control circuits. To accomplish this, it is good design practice to attenuate the transmitted power below the thermal noise power in the bandwidth of the receiver 110, with some margin. A typical margin of 10 to 20 dB is used in practice. As part of this analysis, isolation from Intermediate Frequency (IF) filters or baseband filters may be taken into account. Thus, the equation for determining the minimum diplexer receive filter 120 isolation ($I_{Rx}$), in dB, in the transmit band is given in equation (1), where P is the transmit power from the power amplifier in decibels referenced to a watt (dBW), $\kappa$ is Boltzmann's constant, $F_{Rx}$ is the receiver noise factor, B is the receiver RF bandwidth in Hz, $M_1$ is the margin in dB, and $I_{IF}$ is additional isolation provided by filters after the RFE in dB. It should be noted that the noise factor is a ratio with no units.

$$I_{Rx}=P-10\log(290\kappa(F_{Rx}-1)B)+M_1-I_{IF} \quad (1)$$

In (1), ($F_{Rx}-1$) is used, which assumes no noise input from the antenna 124, a worst-case assumption for this isolation analysis. If a large value of filtering outside the RFE ($I_{IF}$) is used, care must be taken to not saturate the LNA 108 as well. Downconverted spurs from the transmit band power can also be considered as part of the transmit band analysis if the power in the transmit band is still significant when it reaches the mixer in the receiver 110.

The second band of concern in which there is energy emitted from the power amplifier 104 is the receive band 208. To achieve a maximum signal to noise ratio, noise and possibly power from the sidelobes of the modulated transmit signal, which exist in the receive band, can be impeded from reaching the receiver 110. The integrated noise power from the transmitter in the receive band must be 16 dB below the thermal noise power in the receive bandwidth in order to keep the degradation of signal to noise ratio below 0.1 dB. Thus, a margin ($M_2$) of 16 dB can be used for diplexer transmit filter 112 isolation analysis. If sufficient intermediate frequency filtering or baseband spectral shaping is used such that the modulated signal in the receive band is below the noise floor after the power amplifier 104, then the integrated noise power output from the power amplifier in the receive band ($N_{Rx}$) in dBW can be calculated using (2).

$$N_{Rx}=10\log\left(10^{\frac{N_{Tx}+G_{Tx}}{10}}+290\kappa(F_{Tx}-1)B\left(10^{\frac{G_{Tx}}{10}}\right)\right) \quad (2)$$

$N_{Tx}$ is the total noise power in the receive bandwidth from the transmitter 102 in dBW, $G_{Tx}$ is the power amplifier gain in dB, $F_{Tx}$ is the power amplifier noise factor (unitless), and B is the receive bandwidth in Hz. If the modulated signal in the receive band is not below the noise floor, then $N_{Rx}$ can be calculated by integrating the modulated waveform and noise output from the power amplifier 104 over the receive bandwidth 208. Once $N_{Rx}$ is calculated, the minimum diplexer transmit filter 112 isolation ($I_{Tx}$), in dB, in the receive band can be found using (3).

$$I_{Tx}=N_{Rx}+M_2-10\log(290\kappa(F_{Rx}-1)B) \quad (3)$$

Split Isolation RFE Architecture

Figure 3:
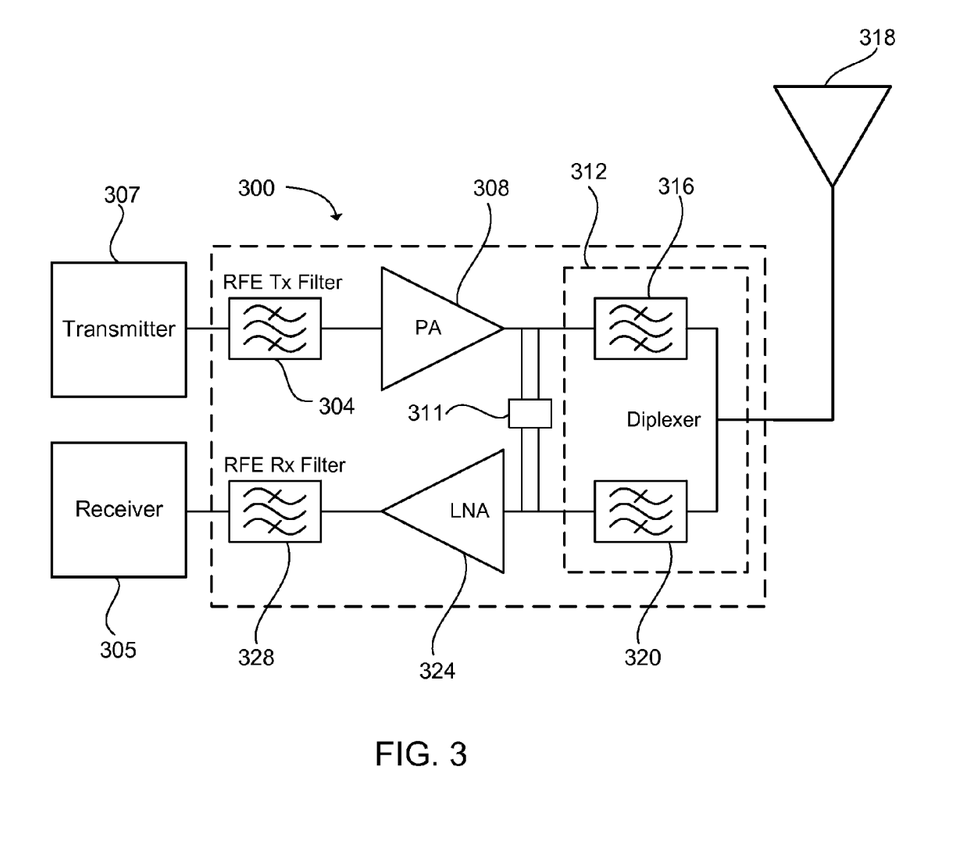
FIG. 3 is a block diagram of a split isolation RFE in accordance with some embodiments of the invention.

A block diagram of one embodiment of a split isolation RFE is shown in FIG. 3. In the split isolation concept, significant amounts of filtering are removed from the diplexer to before the power amplifier 308 and after the LNA 324. This change in design has several distinct advantages. Added flexibility is given to the designer in determining where it is most advantageous to place the filtering. For example, a designer can decide how much filtering to remove from the diplexer transmit filter 316 and move to an RFE transmit filter 304 located on the other side of the power amplifier according to the limitations that will follow. Further, the attenuation from the RFE receive filter can be distributed throughout the receive path. Additionally, the filtering removed from the diplexer can be traded for improved link margin, with fewer sections of filtering of the same type; or for different type filters with the same insertion loss as a traditional transmit diplexer filter 112 but lower rejection, size and weight.

Filtering in the location of the diplexer can be expensive in terms of either the link budget or size and weight. Every dB of insertion loss translates directly to a dB loss in link margin. In contrast, filter insertion loss on the other side of the power amplifier 308 and LNA 324 has virtually no effect on link margin. By reducing the rejection requirements on the diplexer filter, the filter can be implemented with fewer sections, and therefore, have lower insertion loss. The lower insertion loss of the diplexer filter can improve link margin by substantially the same amount.

Alternatively, the reduced rejection requirement can be traded for reduced size and weight. Since insertion loss in the diplexer 312 is so critical, in a traditional RFE architecture, waveguide filters are typically used to minimize the insertion loss. Waveguide diplexers are large, heavy, and expensive. In a typical RFE, the waveguide diplexer can account for approximately half of the size and weight of the RF Electronics. In the split isolation RFE architecture, higher insertion loss filters can be located on the other side of the power amplifier 308 and LNA 324 that are much smaller and lighter than the waveguide diplexers used in a traditional RFE architecture.

By taking a large amount of the rejection requirement out of the diplexer, filter solutions other than waveguide can be considered in the diplexer 312 location. Cavity filters with rejection from 40 to 80 dB can be found with loss comparable to waveguide filters with 110 to 140 dB rejection, yet the cavity filters are about ¼ the size, weight and cost.

Split Isolation RFE Analysis

The same frequency bands are of concern in the isolation analysis of the split isolation RFE 300 as with the traditional RFE 100. For transmit band isolation, the attenuation of the receive diplexer filter 320 can be selected to attenuate the power from the transmitter such that it does not distort the LNA 324. Thus, the minimum isolation of the receive diplexer filter ($I_{DRx}$), in dB, at the transmit frequency can be found using (4).

$$I_{DRx}=P-OP_{1dB}+G_{Rx}+M_3 \quad (4)$$

P is the transmitter power in dBW, $OP_{1dB}$ is the output 1 dB compression point of the LNA 324 in dBW, and $G_{Rx}$ is the LNA gain in dB. A margin ($M_3$) of 5 to 10 dB is typically used to assure the linearity of the LNA, although other values can be used.

Typical values associated with (4) include a transmitter power of 0 dBW to 23 dBW, a 1 dB compression point for the LNA of −20 dBW to −10 dBW, and an LNA gain of 20 to 40 dB. Using these typical numbers, the isolation of the receive diplexer filter at the transmit frequency can vary from 35 dB to 93 dB. It should be noted that values well outside the typical values given within this document are within the scope of the invention.

The isolation of the RFE receive filter 328 located after the LNA ($I_{FRx}$) can be calculated simply using (1), (4) and (5).

$$I_{FRx}=I_{Rx}-I_{DRx} \quad (5)$$

Using the typical values previously listed, and assuming a transmit band isolation level of 100 dB to 140 dB, the RFE receive filter can have typical values from 7 dB to 105 dB.

In order to achieve minimal filtering in the diplexer transmit filter 316, minimal noise must be output from and therefore input to the power amplifier 308 over the receive bandwidth. To achieve minimal noise input to the power amplifier, the RFE transmit filter 304, located before the power amplifier 308, is used to attenuate the noise power in the receive bandwidth from the transmitter 307 below the thermal noise in the transmit path. This will reduce the noise power in the receive bandwidth output from the power amplifier to only thermal noise and noise generated by the power amplifier. Also, to achieve minimal noise output from the power amplifier, only passive elements are usually inserted between the RFE transmit filter and the power amplifier. Active elements can introduce extra noise in the transmit path, and therefore are typically avoided. The isolation provided by the transmit filter before the power amplifier ($I_{FTx}$), in dB at the receive frequency can be calculated with (6).

$$I_{FTx}=N_{Tx}-10 \log(290\kappa F_{Tx}B)+M_4 \quad (6)$$

Example ranges of values used to determine the RFE transmit filter 304 isolation level in the split isolation architecture include a noise power from the transmitter 307 of −150 dBm/Hz to −100 dBm/Hz, and a noise floor value of the power amplifier of −174 dBm/Hz to −160 dBm/Hz. A margin $M_4$ of about 10 to 20 dB can be used to ensure that the noise power output from the power amplifier 308 is not measurably increased above the thermal noise and noise generated by the power amplifier 308.

With only thermal noise entering the power amplifier 308, the noise output from the power amplifier 308 in the receive bandwidth ($N_{Rx}$) is then $$N_{Rx}=10 \log(290\kappa F_{Tx}B)+G_{Tx}. \quad (7)$$

Equation (7) assumes that the power amplifier 308 will not regrow modulated sidelobes from the transmit signal in the receive band above the noise power output by the power amplifier 308. It has been found that, due to slow phase effects from filtering, sidelobes in the receive band typically do not regrow above the noise power output from the power amplifier. This postulate was tested under CDL data rates and modulation types. Even with a low noise figure in the tested power amplifier of approximately 4 dB, and with the power amplifier pushed into saturation, the postulate held true and the sidelobes in the receive band did not regrow above the maximum noise output from the power amplifier.

Inserting (7) into (3) and canceling thermal noise from the power amplifier 308 and low noise amplifier 324 yields the equation for the minimum isolation in the diplexer transmit filter 316 ($I_{DTx}$) at the receive frequency in the split isolation RFE 300 shown in (8).

$$I_{DTx}=10 \log(F_{Tx})-10 \log(F_{Rx}-1)+G_{Tx}+M_2 \quad (8)$$

Since the noise factor of the LNA 324 is typically small when compared to the noise factor and gain of the power amplifier 308, it can be ignored, giving the elegant equation in (9), where $NF_{Tx}$ is the power amplifier noise figure in dB.

$$I_{DTx}=NF_{Tx}+G_{Tx}+M_2 \quad (9)$$

Typical values of a solid state power amplifier for noise figure can be about 4 dB to 10 dB and a gain of approximately 25 dB to 50 dB. If a traveling wave tube amplifier is used, a gain of about 50 dB to 60 dB can be expected with a similar noise figure to solid state devices. A typical margin $M_2$ is around 10 dB to 20 dB. Thus, for a solid state power amplifier, the diplexer transmit filter 316 at the receive frequency can have a value of around 39 dB to 80 dB. For a traveling wave tube amplifier, the diplexer receive filter can have a value of 64 dB to 90 dB.

The split isolation RFE 300 may provide reduced resistance to jamming outside the receive bandwidth compared to a traditional RFE 100, while vulnerability of the split isolation design to a jammer in the receive bandwidth remains substantially equal to the traditional RFE. Although this reduced resistance should not be ignored, even with a relatively low end diplexer filter rejection of 50 dB, out-of-band jamming signals with up to 1 kW of power received by the antenna can be withstood by the split isolation RFE with no damage. If additional resistance to jammers is needed, a limiter can be added to the split isolation RFE with little impact on the size and weight of the RFE, greatly increasing the jammer level the split isolation RFE can withstand both in-band and out-of-band.

Figure 4:
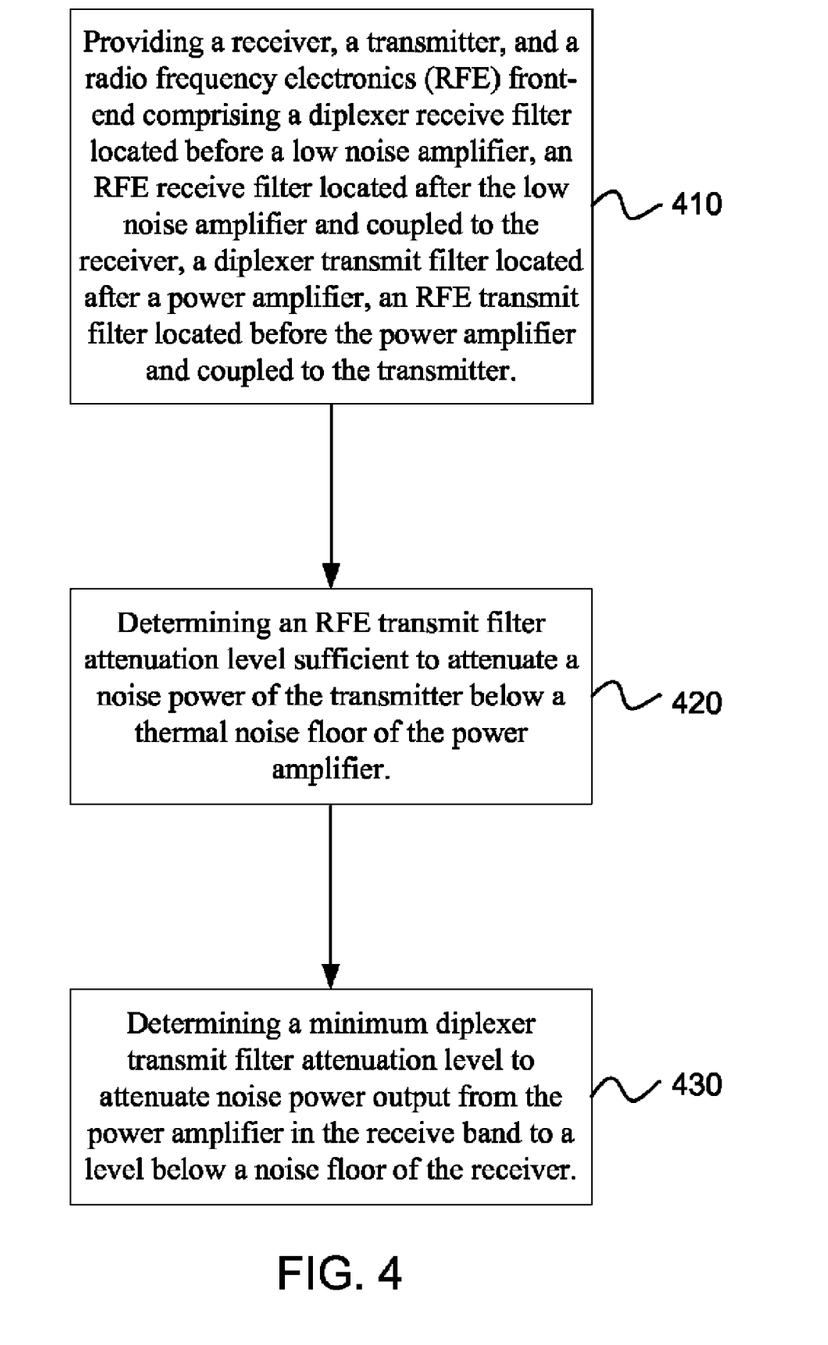
FIG. 4 is a flow chart depicting a method for designing a full duplex communications transceiver to enable a reduction in isolation between a transmit signal and a receive signal at a diplexer in accordance with some embodiments of the present invention.

One embodiment of the present invention provides a method 400 for designing a full duplex communications transceiver to enable a reduction in isolation between a transmit signal and a receive signal at a diplexer, as shown in the flow chart of FIG. 4. The method includes the operation of providing 410 a receiver, a transmitter, and a radio frequency electronics (RFE) front-end comprising a diplexer receive filter located before a low noise amplifier, an RFE receive filter located after the low noise amplifier and coupled to the receiver, a diplexer transmit filter located after a power amplifier, an RFE transmit filter located before the power amplifier and coupled to the transmitter.

The method further includes the operation of determining 420 an RFE transmit filter attenuation level sufficient to attenuate a noise power of the upconverter below a noise floor of the power amplifier. The RFE transmit filter isolation value can be determined using equation (6). The method additionally includes determining 430 a minimum diplexer transmit filter attenuation level to attenuate noise power output from the power amplifier in the receive band to a level below a noise floor of the receiver. The diplexer transmit filter isolation value can be determined using equation (9).

A minimum diplexer receive filter attenuation level can be calculated to attenuate a transmit signal output from the power amplifier to a level below a 1 dB compression point of the low noise amplifier. The minimum diplexer receive filter attenuation level can be determined using equation (4). An RFE receive filter attenuation level can be calculated such that the diplexer receive filter and the RFE receive filter together provide sufficient filtering to attenuate the transmit signal below a thermal noise power of the receiver band. The RFE receive filter can be determined using equation (5) and equation (1).

Split Isolation RFE Design Systems

Figure 5:
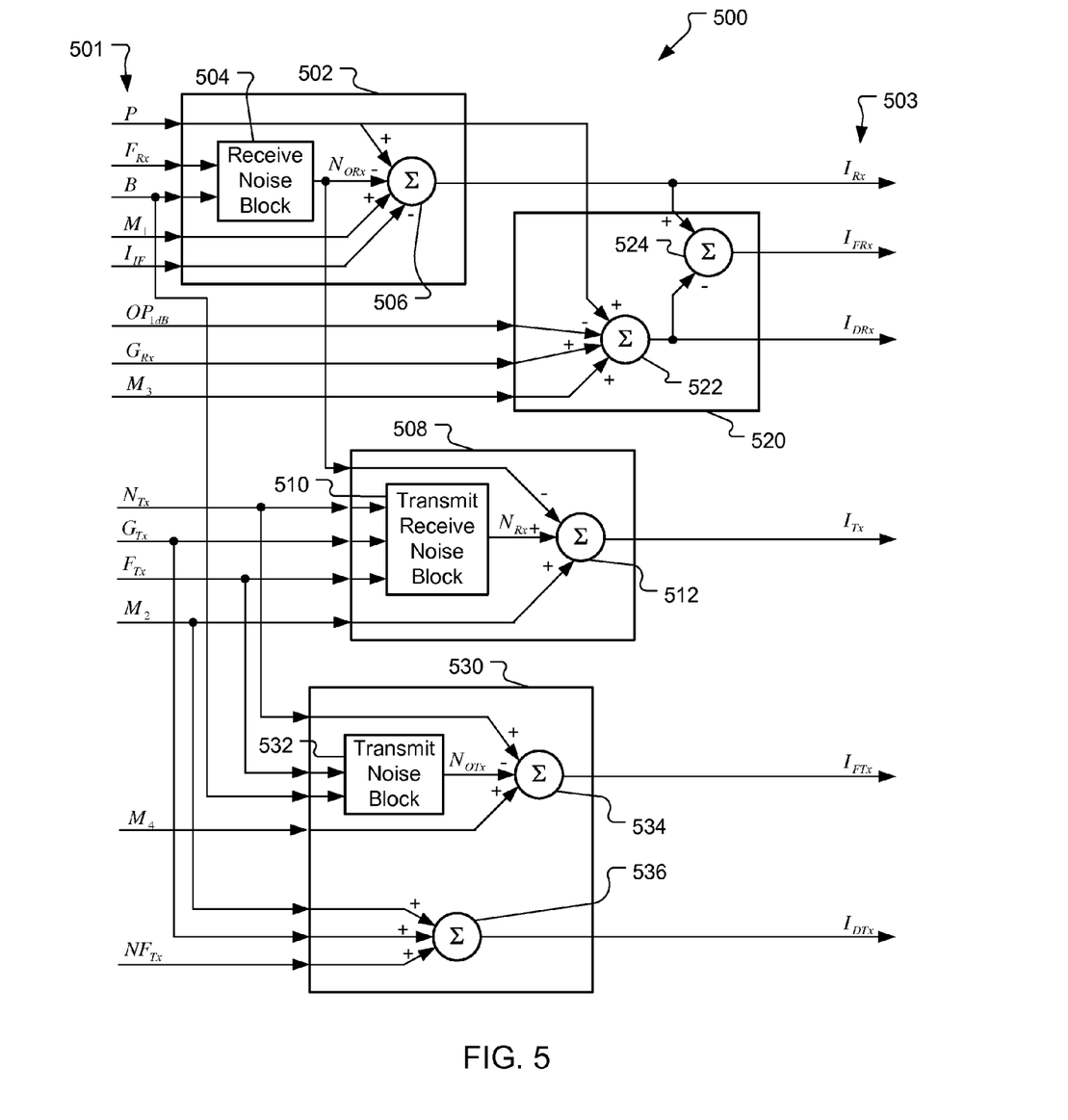
FIG. 5 is a block diagram of a system for automatically determining isolation values for a split isolation RFE in accordance with some embodiments of the invention.

Design of a split isolation RFE can be automated. For example, FIG. 5 illustrates one embodiment of a system for automatically determining isolation values for a split isolation RFE. The system, shown generally at 500, can accept as input parameters 501 the performance parameters corresponding to physical hardware components in a communication system. For example, the communication system can be a communication system to be designed, built, or integrated together. For example, the communication system can include components as illustrated in FIG. 3. Input parameters to the design system can thus include, for example:

PA output power level, P (dBW)
Receiver noise factor, $F_{Rx}$ (unitless)
Receiver bandwidth, B (Hz)
Additional isolation within the receiver, $I_{IF}$ (dB)
Traditional diplexer receive margin, $M_1$ (dB)
Transmitter noise power in the receive bandwidth $N_{TX}$ (dBW)
Power amplifier gain $G_{TX}$ (dB)
Power amplifier noise factor $F_{TX}$ (unitless)
Split isolation diplexer transmit margin, $M_2$ (dB)
Output 1 dB compression point of LNA $OP_{1dB}$ (dBW)
Gain of LNA $G_{RX}$ (dB)
Split isolation diplexer receive margin $M_3$ (dB)
Split isolation transmit filter margin $M_4$ (dB)
Power amplifier noise figure $NF_{TX}$ (dB)

The input parameters are described in further detail above.

The input parameters can be used by various blocks of the system 500 to determine isolation values to be provided by various components of the split isolation RFE. For example, the design system can provide output parameters 503 which include:

Total isolation between the transmitter and receiver within the transmit band, $I_{RX}$ (dB)
Total isolation between the transmitter and receiver within the receive band, $I_{TX}$ (dB)
Minimum diplexer receive filter isolation $I_{DRX}$ (dB)
Minimum RFE receive filter isolation $I_{FRX}$ (dB)
Minimum RFE transmit filter isolation $I_{FTX}$ (dB)
Minimum diplexer transmit filter isolation $I_{DTX}$ (dB)

The output parameters can be provided in a form in which they can be used to design or specify the design of the various components. For example, the output parameters can be provided in a displayed or printed format usable by an engineer, or in an electronic format usable by a computer automated design system.

The system 500 can include a number of blocks that provide an automated determining capability configured to automatically determine the various output parameters. For example, the system can include a transmit band isolation block 502. The transmit band isolation block can determine the total isolation between the transmitter and receiver at transmit frequencies. In particular, the transmit band isolation block can combine the PA output power level, receiver noise factor, and additional isolation within the receiver input parameters using receive noise block 504 and summer 506. The noise block can determine a receiver internal noise floor $N_{ORX}$ calculated as $N_{ORX}=290\kappa(F_{RX}-1)B$ ($\kappa$ is Boltzmann's constant as described above). The noise floor $N_{ORX}$ can be converted into dB. Summer 506 can combine P, $N_{ORX}$, $M_1$, and $I_{IF}$ to obtain the total transmit band isolation $I_{RX}$. The transmit band isolation block can therefore determine $I_{RX}$ in accordance with equation (1). Accordingly, the transmit band isolation block is one example of a means for determining a transmit band isolation.

The system 500 can also include a receive band isolation block 508. The receive band isolation block can use the transmitter noise factor, power amplifier gain, and transmitter noise power in the receive bandwidth to determine the integrated noise power output from the power amplifier in the receive band using transmit receive noise block 510. Transmit receive noise block can determine the integrated noise power output from the power amplifier in the receive band, $N_{RX}$, in accordance with equation (2). Alternatively, the integrated noise power output from the power amplifier in the receive band can be provided to the system as an input parameter and transmit receive noise block 510 eliminated. The receive band isolation block can combine the integrated noise power output from the power amplifier in the receive band with the margin and receiver internal noise floor using summer 512 to obtain the total isolation between the transmitter and receiver within the receive band, $I_{TX}$. The receive band isolation block can therefore determine $I_{TX}$ in accordance with equation (3). Accordingly, the receive band isolation block is one example of a means for determining a diplexer transmit filter attenuation level sufficient to attenuate the noise power output from the power amplifier in the receive band below the noise floor of the receiver.

The system 500 can be used to automatically determine allocations of the transmit band isolation between the diplexer and the RFE receive filter. For example, the system can include a receive filter allocator block 520. The receive filter allocator can combine the transmitter power output, LNA 1 dB compression point, LNA gain, and split isolation diplexer receive margin, $M_3$ using summer 522 to determine the minimum isolation of the receive diplexer filter $I_{DRX}$ to attenuate the transmit power in the transmit band sufficiently to avoid distortion in the LNA. The minimum isolation of the receive diplexer filter can be determined in accordance with equation (4). Accordingly, summer 522 is one example of a means for determining a minimum diplexer receive filter attenuation level to attenuate a transmit signal output from the power amplifier to a level below a 1 dB compression point of the low noise amplifier. The receive filter allocator can combine the minimum isolation of the receive diplexer filter with the transmit band isolation to determine the isolation of the RFE receive filter, $I_{FRX}$ using summer 524. The isolation of the RFE receive filter can be determined in accordance with equation (5). Accordingly, summer 524 is one example of a means for determining an RFE receive filter attenuation level such that the diplexer receive filter and the RFE receive filter together provide sufficient filtering to attenuate the transmit signal below a thermal noise power of the receive band.

The system 500 can also be used to determine allocations of the receive band isolation between the diplexer and the RFE transmit filter. For example, the system can include a transmit filter allocator block 530. The transmit filter allocator can determine the transmitter internal noise floor $N_{OTX}$ from the transmitter noise figure and bandwidth in the transmit noise block 532. The transmit noise block can determine the internal transmitter noise floor, as $N_{OTX}=290\kappa F_{TX}B$ ($\kappa$ is Boltzmann's constant as described above). The noise floor $N_{OTX}$ can be converted into dB. Summer 534 can combine the transmitter noise power in receive bandwidth $N_{TX}$, internal transmitter noise floor $N_{OTX}$, and desired split isolation transmit filter margin $M_4$ to obtain the RFE transmit filter isolation $I_{FTX}$. The transmit band isolation block can therefore determine $I_{FTX}$ in accordance with equation (6). Accordingly, the transmit noise block 532 and summer 534 are one example of a means for determining an RFE transmit filter attenuation level sufficient to attenuate a noise power of the transmitter below a thermal noise floor of the power amplifier.

The transmit filter allocator 530 can combine the power amplifier gain with the power amplifier noise factor and desired margin $M_2$ to determine the isolation of the diplexer transmit filter, $I_{DTX}$ using summer 536. The isolation of the diplexer transmit filter can be determined in accordance with equation (9). Accordingly, summer 536 is one example of a means for determining a minimum diplexer transmit filter attenuation level to attenuate noise power output from the power amplifier in a receive band to a level below a noise floor of the receiver.

The blocks 502, 508, 520, 530 or components thereof (e.g., summers 506, 512, 522, 524, 534, 536) of the system 500 can be implemented in hardware. For example, in some embodiments, the blocks can be implemented in discrete digital logic. In some embodiments, the blocks can be implemented in one or more field programmable gate arrays or application specific integrated circuits.

The system 500 need not include all of the blocks. For example, if only receive isolation values are desired, blocks 508 and 530 can be omitted. Conversely, if only transmit isolation values are desired, blocks 502 and 520 can be omitted. In general, when split isolation is being used, block 508 is not necessary and can be omitted.

Figure 6:
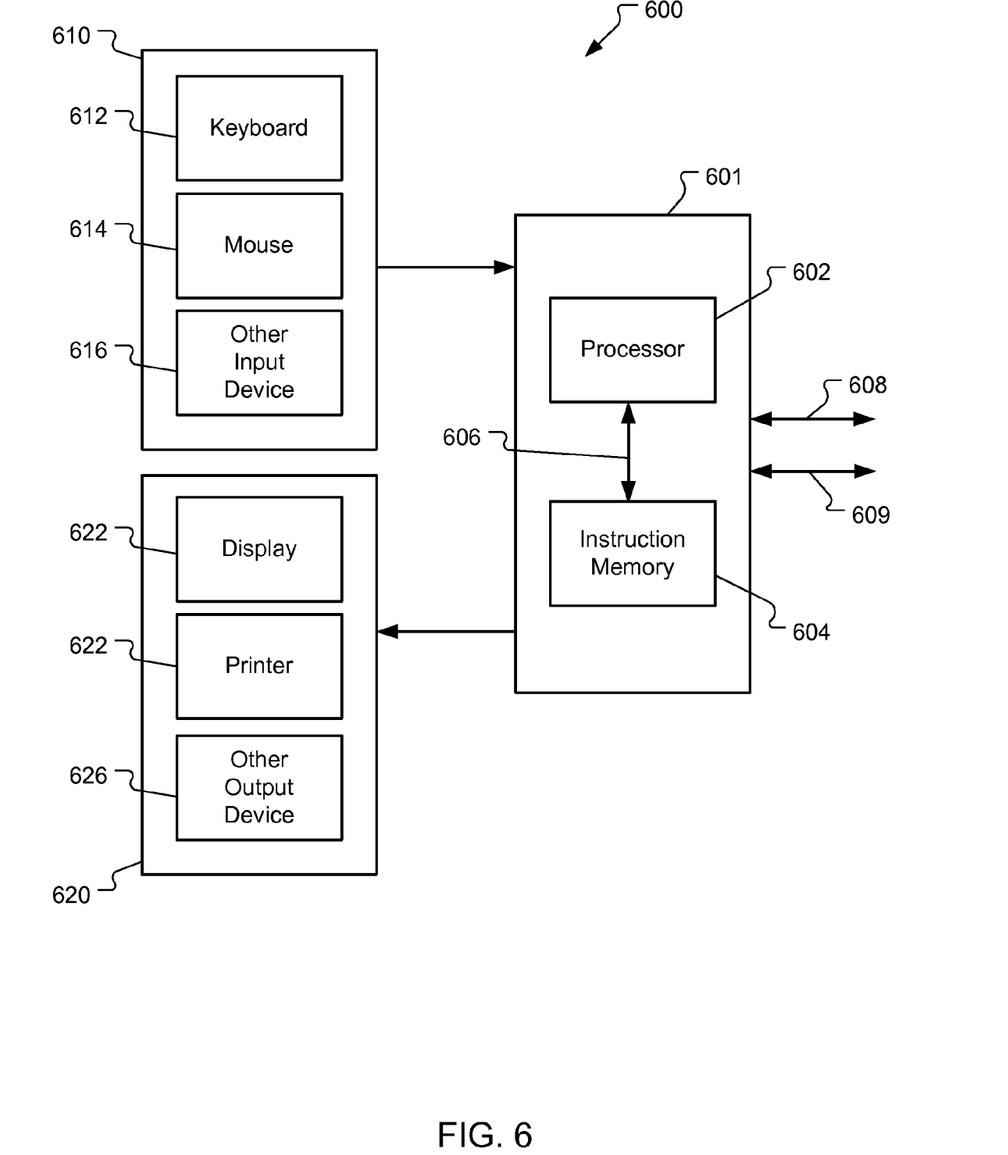
FIG. 6 is a block diagram of a computer system which can be used to implement one or more blocks of the system of FIG. 5 in accordance with some embodiments of the invention.

In some embodiments, one or more of the blocks of the system 500 can be implemented in software for execution on a specialized or general purpose processor. For example, FIG. 6 illustrates a computer system 600 which can be used to implement one or more of the blocks of the system. The computer system can include a general-purpose or special-purpose processing subsystem 601. For example, the computer system can be a personal computer, a notebook computer, a personal digital assistant (PDA) or other hand-held device (e.g., a cellular telephone), a workstation, a minicomputer, a mainframe, a supercomputer, a multi-processor system, a network computer, a processor-based consumer electronic device, or the like. The processing subsystem can include a processor 602 and an instruction memory 604. The processor can be capable of executing computer-executable instructions received from the instruction memory via a bus 606 or similar interface. The processor can be a single processor or multiple processors (e.g., a central processor and one or more other processors designed to perform a particular function or task). The instruction memory may be integrated into the same semiconductor device or package as the processor. The bus can be configured to connect various components of the computer system, and can include any of a variety of bus structures including a memory bus or memory controller, a peripheral bus, or a local bus that uses any of a variety of bus architectures. The bus can be used to interconnect the processor, instruction memory, and other components, such as mass storage devices, input/output interfaces, network interfaces, and the like.

As describer further below, computer-executable instructions can cause the processor 602 to execute functions to implement the blocks as described above. The computer-executable instructions can be permanently stored in the instruction memory 604 or temporarily stored in the instruction memory and loaded into the instruction memory from a computer-readable medium, for example, via an interface 608. The computer-executable instructions can include data structures, objects, programs, routines, or other program modules that can be accessed by the processor. For example, computer executable instructions can include operating system instructions used to establish communication or enable loading of programs, such as during start-up of the computer system. In general, computer-executable instructions cause the processor to perform a particular function or group of functions and are examples of program code means for implementing methods disclosed herein. Furthermore, a particular sequence of the executable instructions provides an example of corresponding acts that can be used to implement the operations of such methods.

Examples of computer-readable media include random-access memory (RAM), read-only memory (ROM), programmable read-only memory (PROM), erasable programmable read-only memory (EPROM), electrically-erasable programmable read-only memory (EEPROM), compact disk read-only memory (CD-ROM), digital video disk (DVD), magnetic medium, or any other device or component that is capable of providing data or executable instructions that can be accessed by a processor. Computer-readable media can be a non-transitory media (e.g., a physical device as described above) which allows for permanent, semi-permanent, or temporary storage of executable instructions.

The computer system 600 can include various input/output interfaces, including for example interfaces to input devices 610 and output devices 620. Various types of input devices can be used, including for example a keyboard 612, a mouse 614, or other 616 input device types (e.g., a trackball, a light pen, a stylus, a joystick, or other pointing devices; a tablet or touch pads; and the like). Examples of interfaces that can be used to connect input devices to the computer system include a serial port, a parallel port, a game port, a universal serial bus (USB), a firewire port (IEEE 1394), and the like. The input devices can be used for entry of the parameters (e.g., 501) into the system. Output devices can include a display 622, a printer 624, or other 626 output devices (e.g., a speaker; and the like). Examples of interfaces that can be used to connect output devices to the computer system include a video adapter, an audio adapter, a parallel port, and the like. Output devices can be used for output of parameters (e.g., 503) from the system. Not all input device types and output device types illustrated in FIG. 6 or described herein need to be included, and the computer system can include one or more of differing input devices and output device types, and one or more of each input or output device type.

The computer system 600 can include a network interface 609 to enable the system to exchange information with one or more other local or remote computers. Network interfaces can include wired and wireless links, including for example connection to a local area network (LAN), a wide area network (WAN) (e.g. the Internet), a modem, wireless link, or the like. In a networked system, accessible program modules or portions thereof can be stored in a remote memory storage device and transferred through the network for loading into the instruction memory 604. Furthermore, in a networked system the computer system can participate in a distributed computing environment, where functions or tasks are performed by a plurality of networked computers. For example, a client-server architecture can be used wherein some functions are performed by the local client computer system and other functions are performed by a remote server computer, with operation of the local client computer system and the remote server computer coordinated through the network connection. The server computer can include an architecture generally similar to the computer system, and thus need not be described further.

Figure 7:
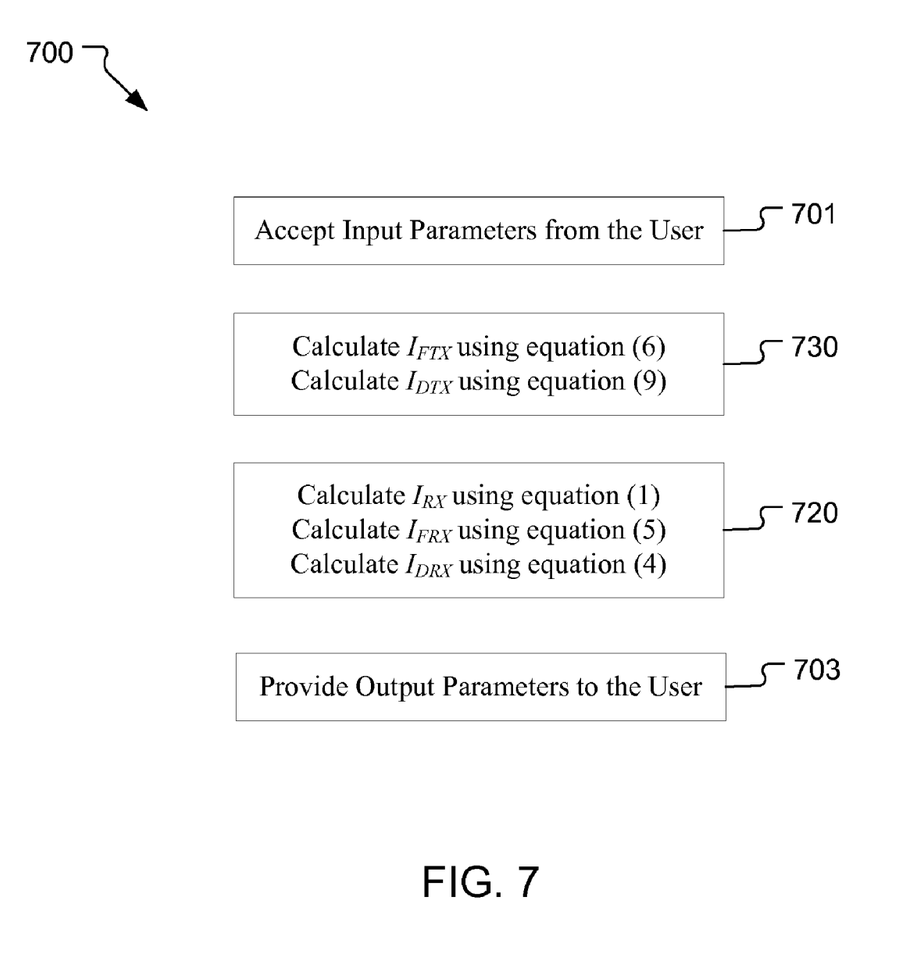
FIG. 7 is a flow chart showing operation of the computer system of FIG. 6 to implement a system of automatically determining isolation values for a split isolation RFE in accordance with some embodiments of the invention.

Accordingly, the computer system 600 can be used to implement one or more blocks of the system 500 in distinct software modules. The software modules can include instructions to cause the processor 602 to execute to implement the module. For example, a flow chart is illustrated in FIG. 7 illustrated a method 700 which can be implemented using the computer system 600. An input module 701 and output module 703 can be used to input and output parameters, for example, through the input devices 610 and output devices 620.

A transmit filter allocator module 730 can determine the internal transmitter noise floor and combine the internal transmitter noise floor with the transmitter noise power in the receive band and desired split isolation transmit filter margin to obtain the RFE transmit filter isolation as described above. Accordingly, the transmit filter allocation module can include another example of a means for determining an RFE transmit filter attenuation level sufficient to attenuate a noise power of the transmitter below a thermal noise floor of the power amplifier. The transmit filter allocator module can also combine the power amplifier gain with the power amplifier noise figure and desired margin to determine the isolation of the diplexer transmit filter. Accordingly, the transmit filter allocator can include another example of a means for determining a minimum diplexer transmit filter attenuation level to attenuate noise power output from the power amplifier in a receive band to a level below a noise floor of the receiver. The transmit filter allocator module can operate similarly to the transmit filter allocator block 530.

A receive filter allocator module 720 can combine the transmitter power output, LNA 1 dB compression point, LNA gain, and split isolation diplexer receive margin to determine the minimum isolation of the receive diplexer filter to attenuate the transmit power in the transmit band sufficiently to avoid distortion in the LNA. Accordingly, the receive filter allocator module can include another example of means for determining a minimum diplexer receive filter attenuation level to attenuate a transmit signal output from the power amplifier to a level below a 1 dB compression point of the low noise amplifier. The receive filter allocator module can combine the minimum isolation of the receive diplexer filter with the transmit band isolation to determine the isolation of the RFE receive filter. Accordingly, the receive filter allocator module can also include another example of a means for determining an RFE receive filter attenuation level such that the diplexer receive filter and the RFE receive filter together provide sufficient filtering to attenuate the transmit signal below a thermal noise power of the receive band. The receive filter allocator module can operate similarly to receive filter allocator block 520.

If desired, a transmit band isolation module (not shown) can include software instructions that cause the processor to determine the total isolation between the transmitter and receiver within the transmit band, $I_{RX}$, as described above. For example, the transmit band isolation module can cause the processor to combine the receiver noise factor and receiver bandwidth to determine a receiver internal noise floor, and combine the receive internal noise floor, traditional diplexer receive margin, and additional isolation within the receiver to determine the transmit band isolation. Accordingly, the transmit band isolation module is another example of a means for determining a transmit band isolation. The transmit band isolation module can operate similarly to transmit band isolation block 502. If desired, a receive band isolation module (not shown) can include software instructions that cause the processor to determine the total isolation between the transmitter and receiver within the receive band, $I_{TX}$, as described above. For example, the receive band isolation module can cause the processor to combine the integrated noise power output from the power amplifier in the receive band with the split isolation receive band margin and the receiver internal noise floor to determine the total transmit isolation. If desired, the receive band isolation module can include software instructions that cause the processor to determine the integrated noise power output from the power amplifier in the receive band as described above. Accordingly, the receive band isolation module is another example of a means for determining a diplexer transmit filter attenuation level sufficient to attenuate the noise power output from the power amplifier in the receive band below the noise floor of the receiver. The receive band isolation module can operate similarly to receive band isolation block 508.

Not all of the modules need to be used in the computer system 600. For example, if only transmit isolation values are desired, the receive filter allocator module 720 can be omitted. Conversely, if only receive isolation values are desired, the transmit filter allocator module 730 can be omitted. Moreover, the order of execution of the modules 720, 730 can be interchanged if desired.

Benefits of Some Embodiments of the Invention

Applications where the combined gain and noise figure of the power amplifier 308 are relatively low can gain the largest advantage by switching to the split isolation architecture 300, as shown in FIG. 3. For example, solid state power amplifiers have a combined gain and noise figure that are relatively low. Applications using a microwave power module or a traveling wave tube amplifier may not see as much benefit from switching to the split isolation architecture due to a higher noise figure and gain of these amplifiers.

One instance where the split isolation RFE 300 typically has added benefit is in CDL systems that require the ability to flop transmit and receive frequency bands. In a traditional RFE, in order to achieve floppability, four switches are needed to attain the 120 to 140 dB of isolation required from the diplexer. When these large, heavy waveguide switches are included in the diplexer, it greatly increases the cost of the diplexer along with its size and weight. In the split isolation RFE, with the reduced rejection requirements for the diplexer filters, only a single transfer switch 311 may be required to flop bands, saving size, weight and cost.

The use of a split isolation architecture 300 can also be a recurring cost cutting measure. For example, a typical simple CDL diplexer can cost from $5000 to $25000, depending on requirements. In contrast, typical cavity filters which can be used in the split isolation architecture cost in the neighborhood of $200 to $800.

Split isolation RFEs can also be beneficial in applications that require very low size and weight. CDL or CDL type links recently have expanded to unmanned aerial reconnaissance vehicles and portable applications such as Rover III. These applications can be extremely sensitive to size, weight and power requirements. By freeing the RFE designer from the necessity of a waveguide diplexer, the split isolation RFE makes possible the design of very small and light RFEs. A full duplex, medium power (~15 W), CDL capable split isolation RFE on a single circuit card assembly under 2 pounds and 25 cubic inches is within the realm of possibility opened up by this new architecture. In contrast, a small, lightweight CDL RFE using the standard architecture is around 5 pounds and 100 cubic inches. Typical RFEs are around 25 pounds and 2400 cubic inches. Transitioning to the split isolation architecture can provide a remarkable decrease in size and weight. This decrease in size and weight enabled by the split isolation architecture opens up the possibility of common data links for a variety of size, weight, and power constrained platforms and applications.

The units in the equations disclosed above are specified in ratio values of decibels and decibels relative to watts. It can be appreciated that any equivalent type of ratio value can also be used, such as decibels relative to milliwatts or other equivalents. Accordingly, the inclusion of units in the above examples are not intended to be limiting and are merely provided by way of example.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for determining isolation values for a split isolation radio frequency electronics (RFE), the system comprising:
   a means for determining an RFE transmit filter attenuation level sufficient to attenuate a noise power of the transmitter below a thermal noise floor of the power amplifier; and
   a means for determining a minimum diplexer transmit filter attenuation level to attenuate noise power output from the power amplifier in a receive band to a level below a noise floor of the receiver.

2. The system of claim 1, further comprising a means for determining a minimum diplexer receive filter attenuation level to attenuate a transmit signal output from the power amplifier to a level below a 1 dB compression point of the low noise amplifier.

3. The system of claim 1, further comprising a means for determining an RFE receive filter attenuation level such that the diplexer receive filter and the RFE receive filter together provide sufficient filtering to attenuate the transmit signal below a thermal noise power of the receive band.

4. The system of claim 3, wherein the means for determining a minimum diplexer receive filter attenuation level determines the minimum diplexer receive filter attenuation level according to the equation:

$$I_{DRx} = P - OP_{1dB} + G_{Rx} + M_3$$

where $I_{DRx}$ is the attenuation level of the diplexer receive filter in dB, P is a power level of the transmitter, $OP_{1dB}$ is the 1 dB compression point of the low noise amplifier, $G_{Rx}$ is a gain of the low noise amplifier, and $M_3$ is a margin having a predetermined value.

5. The system of claim 3, wherein the means for determining the RFE receive filter attenuation level determines the minimum RFE receive filter attenuation level according to the equation $$I_{FRx} = I_{Rx} - I_{DRx}$$

where $I_{FRx}$ is the attenuation level of the RFE receiver filter in dB and $I_{Rx}$ is a transmit band isolation in dB, and wherein the transmit band isolation $I_{Rx}$ is determined according to the equation:

$$I_{Rx} = P - 10 \log(290 \kappa (F_{Rx}-1)B) + M_1 - I_{IF}$$

where P is a transmit power from the power amplifier in decibels referenced to a watt (dBW), $\kappa$ is Boltzmann's constant, $F_{Rx}$ is a receiver noise factor, B is a receiver RF bandwidth in Hz, $M_1$ is a margin in dB, and $I_{IF}$ is additional isolation provided by filters after the RFE in dB.

6. The system of claim 1, wherein the means for determining the RFE transmit filter attenuation level determines the RFE transmit filter attenuation level according to the equation:

$$I_{FTx} = N_{Tx} - 10 \log(290 \kappa F_{Tx} B) + M_4$$

where $I_{FTx}$ is the RFE transmit filter attenuation level in dB, $N_{Tx}$ is a total noise power in a receive bandwidth from the transmitter, $10 \log(290 k F_{Tx} B)$ is a noise floor of the power amplifier where k is Boltzmann's constant, $F_{Tx}$ is a power amplifier noise factor, B is a receive bandwidth in Hz, and $M_4$ is a margin having a predetermined value.

7. The system of claim 1, wherein the means for determining the minimum diplexer transmit filter attenuation level determines the minimum diplexer transmit filter attenuation level according to the equation:

$$I_{DTx} = NF_{Tx} + G_{Tx} + M_2$$

where $I_{DTx}$ is the minimum diplexer transmit filter attenuation level in dB, $NF_{Tx}$ is a power amplifier noise figure, $G_{Tx}$ is a gain of the power amplifier, and $M_2$ is a margin having a predetermined value.

8. A method for designing a full duplex communications transceiver, wherein the full duplex communications transceiver comprises a receiver, a transmitter, and a radio frequency electronics (RFE) front-end comprising a diplexer receiver filter located before a low noise amplifier, an RFE receive filter located after the low noise amplifier and coupled to the receiver, a diplexer transmit filter located after a power amplifier, an RFE transmit filter located before the power amplifier and coupled to the transmitter, the method comprising:
   obtaining a design system having a user input interface, a user output interface, and an automated determining capability;
   inputting a plurality of input parameters into the user input interface of the design system, the plurality of input parameters comprising: a transmitter power level, and a thermal noise floor of the power amplifier;
   determining with the automated determining capability an RFE transmit filter attenuation level sufficient to attenuate a noise power of the transmitter below a thermal noise floor of the power amplifier; and
   determining with the automated determining capability a minimum diplexer transmit filter attenuation level to attenuate noise power output from the power amplifier in a receive band to a level below a noise floor of the receiver; and
   outputting a plurality of output parameters to the user output interface, the plurality of output parameters comprising: the RFE transmit filter attenuation level and the minimum diplexer transmit filter attenuation level.

9. The method of claim 8, further comprising determining with the automated determining capability a minimum diplexer receive filter attenuation level to attenuate a transmit signal output from the power amplifier to a level below a 1 dB compression point of the low noise amplifier.

10. The method of claim 9, further comprising determining with the automated determining capability an RFE receive filter attenuation level such that the diplexer receive filter and the RFE receive filter together provide sufficient filtering to attenuate the transmit signal below a thermal noise power of the receive band.

11. The method of claim 10, wherein determining the minimum diplexer receive filter attenuation level further comprises determining the minimum diplexer receive filter attenuation level according to the equation:

$$I_{DRx} = P - OP_{1dB} + G_{Rx} + M_3$$

where $I_{DRx}$ is the attenuation level of the diplexer receive filter in dB, P is a power level of the transmitter, $OP_{1dB}$ is the 1 dB compression point of the low noise amplifier, $G_{Rx}$ is a gain of the low noise amplifier, and $M_3$ is a margin having a predetermined value.

12. The method of claim 11, further comprising determining the RFE receive filter attenuation level according to the equation $$I_{FRx}=I_{Rx}-I_{DRx}$$

where $I_{FRx}$ is the attenuation level of the RFE receiver filter in dB and $I_{Rx}$ is a transmit band isolation in dB, and wherein determining the transmit band isolation $I_{Rx}$ further comprises determining the transmit band isolation according to the equation:

$$I_{Rx}=P-10\log(290\kappa(F_{Rx}-1)B)+M_1-I_{IF}$$

where P is a transmit power from the power amplifier in decibels referenced to a watt (dBW), κ is Boltzmann's constant, $F_{Rx}$ is a receiver noise factor, B is a receiver RF bandwidth in Hz, $M_1$ is a margin in dB, and $I_{IF}$ is additional isolation provided by filters after the RFE in dB.

13. The method of claim 8, wherein determining the RFE transmit filter attenuation level further comprises determining the RFE transmit filter attenuation level according to the equation:

$$I_{FTx}=N_{Tx}-10\log(290\kappa F_{Tx}B)+M_4$$

where $I_{FTx}$ is the RFE transmit filter attenuation level in dB, $N_{Tx}$ is a total noise power in a receive bandwidth from the transmitter, $10\log(290kF_{Tx}B)$ is a noise floor of the power amplifier where k is Boltzmann's constant, $F_{Tx}$ is a power amplifier noise factor, B is a receive bandwidth in Hz, and $M_4$ is a margin having a predetermined value.

14. The method of claim 8, wherein determining the minimum diplexer transmit filter attenuation level further comprises determining the minimum diplexer transmit filter attenuation level according to the equation:

$$I_{DTx}=NF_{Tx}+G_{Tx}+M_2$$

where $I_{DTx}$ is the minimum diplexer transmit filter attenuation level in dB, $NF_{Tx}$ is a power amplifier noise figure, $G_{Tx}$ is a gain of the power amplifier, and $M_2$ is a margin having a predetermined value.

15. A computer program product, comprising: a non-transitory computer readable medium having computer executable program code embodied therein, said computer executable program code implementing a method for designing a full duplex communications transceiver, wherein the full duplex communications transceiver comprises a receiver, a transmitter, and a radio frequency electronics (RFE) front-end comprising a diplexer receiver filter located before a low noise amplifier, an RFE receive filter located after the low noise amplifier and coupled to the receiver, a diplexer transmit filter located after a power amplifier, an RFE transmit filter located before the power amplifier and coupled to the transmitter, the method comprising:

providing a system, wherein the system comprises distinct software modules, and wherein the distinct software modules comprise an input module, a receive filter allocator module, and an output module;

accepting a plurality of input parameters from a system user by the input module, the plurality of input parameters comprising: a transmitter power level parameter of the power amplifier and a thermal noise floor of the power amplifier;

determining by the receive filter allocator module an RFE transmit filter attenuation level and a minimum diplexer transmit filter attenuation level in response to the input parameters, wherein the RFE transmit filter attenuation level is sufficient to attenuate a noise power of the transmitter below a thermal noise floor of the power amplifier and the minimum diplexer transmit filter attenuation level is sufficient to attenuate noise power output from the power amplifier in a receive band to a level below a noise floor of the receiver; and outputting a plurality of output parameters to the system user by the output module, the plurality of output parameters comprising: the RFE transmit filter attenuation level and the minimum diplexer transmit filter attenuation level.

16. The computer program product of claim 15, wherein the method further comprises determining a minimum diplexer receive filter attenuation level and an RFE receive filter attenuation level by a transmit filter allocator module, wherein the minimum diplexer receive filter attenuation level is sufficient to attenuate a transmit signal output from the power amplifier to a level below a 1 dB compression point of the low noise amplifier and the RFE receive filter together provide sufficient filtering to attenuate the transmit signal below a thermal noise power of the receive band.

17. The computer program product of claim 16, wherein the method further comprises:

determining the minimum diplexer receive filter attenuation level according to the equation:

$$I_{DRx}=P-OP_{1dB}+G_{Rx}+M_3$$

where $I_{DRx}$ is the attenuation level of the diplexer receive filter in dB, P is a power level of the transmitter, $OP_{1dB}$ is the 1 dB compression point of the low noise amplifier, $G_{Rx}$ is a gain of the low noise amplifier, and $M_3$ is a margin having a predetermined value; and determining the RFE receive filter attenuation level according to the equation $$I_{FRx}=I_{Rx}-I_{DRx}$$

where $I_{FRx}$ is the attenuation level of the RFE receiver filter in dB and $I_{Rx}$ is a transmit band isolation in dB, and the transmit band isolation $I_{Rx}$ is determined according to the equation:

$$I_{Rx}=P-10\log(290\kappa(F_{Rx}-1)B)+M_1-I_{IF}$$

where P is a transmit power from the power amplifier in decibels referenced to a watt (dBW), κ is Boltzmann's constant, $F_{Rx}$ is a receiver noise factor, B is a receiver RF bandwidth in Hz, $M_1$ is a margin in dB, and $I_{IF}$ is additional isolation provided by filters after the RFE in dB.

18. The computer program product of claim 15, wherein the method further comprises:

determining the RFE transmit filter attenuation level according to the equation:

$$I_{FTx}=N_{Tx}-10\log(290\kappa F_{Tx}B)+M_4$$

where $I_{FTx}$ is the RFE transmit filter attenuation level in dB, $N_{Tx}$ is a total noise power in a receive bandwidth from the transmitter, $10\log(290kF_{Tx}B)$ is a noise floor of the power amplifier where k is Boltzmann's constant, $F_{Tx}$ is a power amplifier noise factor, B is a receive bandwidth in Hz, and $M_4$ is a margin having a predetermined value; and determining the minimum diplexer transmit filter attenuation level according to the equation:

$$I_{DTx}=NF_{Tx}+G_{Tx}+M_2$$

where $I_{DTx}$ is the minimum diplexer transmit filter attenuation level in dB, $NF_{Tx}$ is a power amplifier noise figure, $G_{Tx}$ is a gain of the power amplifier, and $M_2$ is a margin having a predetermined value.

* * * * *